United States Patent Office 3,387,655
Patented June 11, 1968

3,387,655
OIL RECOVERY PROCESS USING SURFACTANTS FORMED IN-SITU
Billy G. Hurd, Dallas, Tex., assignor to Mobil Oil Corporation, a corporation of New York
No Drawing. Filed Dec. 22, 1966, Ser. No. 605,143
12 Claims. (Cl. 166—9)

This invention relates to the recovery of oil from subterranean oil reservoirs and, more particularly, to new and improved methods of forming surface-active agents within such reservoirs in waterflood operations.

In the production of oil from oil-bearing formations it usually is possible to recover only a minor portion of the original oil in place by primary recovery methods which utilize only the natural forces present in the reservoir. Thus, a variety of the so-called secondary recovery methods have been employed in order to increase the recovery of oil from subterranean reservoirs. Generally, the most promising of these secondary recovery methods fall within the general classification of waterflooding. In waterflooding, an aqueous flooding medium is introduced into the reservoir in order to displace the oil therein to a suitable production system through which the oil may be withdrawn to the surface of the earth. The aqueous flooding medium may be either brine or fresh water and may or may not contain various additives.

Among the techniques employed for increasing the efficiency of a waterflood process are those in which surface-active agents are added to the flooding medium in order to control the interfacial tension between the water and the reservoir oil. While these agents may greatly increase the total amount of oil recovered, their use many times is prohibitively expensive because of the tendency of the surface-active agents to adsorb out of solution onto the rock surfaces of the reservoir. Thus, the advancing front of the aqueous flooding medium is depleted of the surface-active agents before significant beneficial effects of such agents can be realized.

In order to overcome the problems presented by this adsorption phenomenon, it has been proposed to produce surface-active agents within the reservoir undergoing treatment. Thus, in U.S. Patent No. 3,167,119 to V. G. Meadors, there is disclosed a technique wherein surface-active sulfonic acids are formed in situ by the injection of acids containing a sulfo group. More specifically, the Meadors patent discloses the injection of materials such as sulfuric acid and sulfur trioxide in order to establish a bank of concentrated sulfuric acid adjacent the injection well or wells. As the sulfuric acid bank advances through the reservoir it reacts directly with certain unsaturated compounds such as the aromatic and olefinic constituents of the crude oil to form sulfonic acids.

While the in-situ production of organic sulfonic acids in waterflooding operation shows some promise, the injection of sulfuric acid or sulfur trioxide into subterranean formations often is impractical since the introduction of these materials into permeable formations, particularly those containing even small amounts of calcium, often results in serious plugging of such formations due to the production of insoluble precipitates of calcium sulfate and hydrous oxides as acid is depleted in the liquid acid front. In addition, the direct sulfonation of saturated aliphatics, and in particular the straight chain compounds, is relatively difficult. Thus, direct sulfonation by sufuric acid often is relatively ineffective with regard to the so-called paraffin-base oils which have a relatively low content of unsaturated compounds.

In accordance with the present invention, there is provided a new and improved method of producing surface-active agents within a reservoir by the conversion of certain saturated aliphatic constituents of the reservoir oil to surface-active sulfoxy acids and which does not result in serious plugging of the formation adjacent the water injection system.

The present invention is practiced in a subterranean oil reservoir penetrated by spaced injection and production systems which define the recovery zone of the reservoir. In carrying out the invention, an oxygen-containing gas is introduced into the recovery zone of the reservoir in order to form hydroperoxides of saturated aliphatic constituents of the reservoir oil. Thereafter, an aqueous solution of an alkali metal or ammonium bisulfite is introduced into the recovery zone and into contact with the hydroperoxides. The bisulfite reacts to convert the hydroperoxides to surface-active sulfoxy acids. An aqueous flooding medium then is introduced into the recovery zone via the injection system in order to displace oil within the reservoir to the production system. Such oil then is withdrawn from the reservoir to the surface of the earth through the production system.

In a preferred embodiment of the invention, the aqueous flooding medium comprises an alkaline solution in order to effect a neutralization of the initially formed sulfoxy acids. Preferably, the alkaline solution comprises an aqueous solution of a base selected from the class consisting of alkali metal and ammonium hydroxides or carbonates. The use of these inorganic bases results in the production of anionic surface-active agents which exhibit a relatively small tendency, in comparison with nonionic surface-active agents, to become adsorbed out of solution within the interstices of the reservoir.

In order to enable those skilled in the art to better understand the invention there is provided hereinafter a detailed description including certain specific examples and preferred embodiments of the invention.

As noted previously, the present invention is carried out in a recovery zone of a subsurface oil-bearing reservoir. As will be understood by those skilled in the art, by the term "recovery zone" as used herein and in the appended claims is meant that portion of a reservoir through which oil is displaced to the production system by the injected flooding medium. The injection and production systems may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type pattern the recovery zone as defined by the spaced rows of injection and production wells generally will be that portion of the reservoir underlying the area between these spaced rows. Exemplary of other patterns which may be used is the so-called "circular flood" pattern in which the injection system comprises a central injection well and the production system a plurality of production wells spaced radially about the injection well. Of course, the injection and production systems each may consist of only a single well in which case the recovery zone as defined by the spaced injection and production wells will be the portion of the reservoir underlying a generally elliptical area between these wells which is subject to the displacing action of the injected flooding medium. The above and other patterns are well known to those skilled in the art and for a more detailed description of such patterns, as well as waterflood techniques in general, reference is made to Uren, L. C., Petroleum Production Engineering-oil Field Exploitation, 2nd ed., McGraw-Hill Book Company, Inc., New York and London, 1939, and more particularly to the section entitled "The Water Flooding Process," appearing at pp. 444–459.

It also will be recognized that the invention may be carried out utilizing one or more duly completed injection-production wells of the type, for example, disclosed in U.S. Patent No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more duly completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir.

In carrying out the invention, an oxygen-containing gas is introduced into the recovery zone of the reservoir. This may be accomplished by any suitable technique such as by injecting the gas through the injection system, through the production system or through wells located intermediate of the wells comprising the injection and production systems. However, it is preferred in carrying out the invention to introduce the oxygen-containing gas through the water injection system. This will tend to establish an initial trend of fluid flow within the recovery zone in the direction of the production system and, in addition, will ensure the generation of significant amounts of hydroperoxides, and ultimately sulfoxy acids, in the recovery zone adjacent the injection system.

Any suitable oxygen-containing gas such as air, oxygen-enriched air, or even pure oxygen may be used. However, for purposes of economy and simplicity of operation it usually will be desirable to utilize air as the oxygen-containing gas.

The injected oxygen reacts with saturated aliphatic constituents of the reservoir oil to produce hydroperoxides which are characterized by the —OOH group. As described hereinafter, these hydroperoxides are in turn converted to corresponding sulfoxy acids; more specifically, sulfonates, characterized by the —SO₂OH group, or sulfates, characterized by the —OSO₂OH group. The amount of hydroperoxides formed will depend upon such factors as the reservoir temperature and pressure, the nature of the reservoir oil, and the contact time between the oil and the injected oxygen. While these factors will vary widely from one locale to another, the amount of hydroperoxides formed under any given set of conditions may be predetermined by laboratory tests on the crude oil from the reservoir to be treated.

In general, the amount of hydroperoxides formed for given quantities of oxygen and oil will increase with temperature, pressure, and contact time. It usually will be desirable, where practical, to maintain a temperature on the order of 260° F. or more to obtain efficient hydroperoxide production. If the ambient reservoir temperature is significantly lower than this value, the air or other oxygen-containing gas may be heated as necessary before injection. Such heating, of course, may be accomplished by compression of the oxygen-containing gas to the pressures necessary for injection into the reservoir. Also, the necessary temperature increase will result in many cases from exothermic reaction of the injected oxygen with the reservoir oil.

While any suitable amount of oxygen-containing gas may be injected, it is desirable to obtain distribution of the hydroperoxides within an appreciable extent of the recovery zone. Therefore, it is preferred to inject the oxygen-containing gas in an amount of at least ten percent of the total pore volume of the recovery zone. It usually will be desirable to obtain distribution of the hydroperoxides throughout the recovery zone between the injection and production systems. Thus, where practical, it is preferred to continue injection of the oxygen-containing gas through the injection system for a time period sufficient to permit it to traverse the recovery zone and reach the production zone. Thus, during the oxygen injection step one or more of the wells comprising the production system may be placed on production and the gaseous effluent therefrom monitored for the presence of the oxygen-containing gas.

Subsequent to the oxygen injection step the hydroperoxides are converted to sulfoxy acids. This is accomplished by introducing an aqueous solution of a bisulfite selected from the class consisting of the alkali metal bisulfites and ammonium bisulfite into the recovery zone and into contact with the initially formed hydroperoxides. Preferably, the bisulfite solution is introduced into the recovery zone through the injection system for reasons similar to those given above with regard to the oxygen injection step. Also, it is preferred to allow a period of at least seven days between the time at which the oxygen-containing gas is first injected and the time at which the injection of the bisulfite solution is initiated. This will enable the formation of significant amounts of hydroperoxides in the recovery zone adjacent the injection system. Since the aqueous bisulfite solution will advance through the recovery zone at a much slower rate than the previously injected oxygen-containing gas, the contact time of the oxygen with the reservoir oil, and therefore the amount of hydroperoxides formed, will increase with distance from the injection system.

While any of the above-noted bisulfites may be used in this step of the invention, it is preferred to inject an aqueous solution of sodium bisulfite for reasons of economy and availability. In order to obtain the maximum benefit from the invention it will be desirable to inject the bisulfite in at least the stoichiometric equivalent of the hydroperoxides as indicated by the following overall reaction:

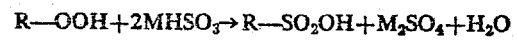

$$R\text{—}OOH + 2MHSO_3 \rightarrow R\text{—}SO_2OH + M_2SO_4 + H_2O$$

wherein:

R is a saturated aliphatic group, and
M is an alkali metal or ammonium ion.

Preferably, the aqueous bisulfite solution will be injected at a concentration within the range of 15 to 25 percent by weight and in an amount within the range of two to ten percent of the pore volume of the recovery zone. Lower concentrations of bisulfites, injected in larger volumes as indicated, may be used in carrying out the invention. However, the higher concentrations within the aforementioned range afford an economy of time and tend toward the production of the sulfonates, which normally exhibit a higher interfacial activity than the corresponding sulfates. In this regard, an excess of bisulfite at the reaction front favors sulfonate production whereas an excess of hydroperoxides favors sulfate production with an attendant decrease in sulfonate production.

After introducing the bisulfite solution into the recovery zone, an aqueous flooding medium is injected into the recovery zone through the injection system. The aqueous flooding medium may be merely fresh water or brine. Preferably, however, the flooding medium comprises an aqueous alkaline solution in order to effect a neutralization of the sulfoxy acids to their corresponding salts. In this regard, the conversion of a sulfoxy acid group to a salt increases the hydrophilic character of this portion of the molecule and thus increases the interfacial activity of the molecule. The preferred solutions for use in this embodiment of the invention are the alkali metal and ammonium bases and, more specifically, the alkali metal and ammonium hydroxides and the alkali metal and ammonium carbonates. Thus, the flooding medium may comprise an aqueous solution of sodium, potassium, or ammonium hydroxides or carbonates as well as the hydroxides and carbonates of the other alkali metals. The carbonates usually will be preferred over the corresponding hydroxides. In this regard, the carbonates will function as buffering agents in the pH range (on the order of about 7.5 to 9.5) most conducive to the production of lower interfacial tension by petroleum sulfonates. In addition, the carbonates in many cases will tend to enhance the water wettability of the reservoir.

The relatively strong water-soluble organic bases also may be used in carrying out this embodiment of the invention. Thus, aqueous solutions of organic bases such as ethylamine, isopropylamine, triethanolamine and like compounds may be utilized to effect neutralization of the sulfoxy acids. It usually will be desired, however, to utilize the inorganic bases noted above in order to produce alkali metal or ammonium salts of the sulfoxy acids. Such salts exhibit a high surface activity and are less readily adsorbed from solution than are the neutralization complexes resulting from the use of the various organic bases.

Of the inorganic bases, it usually will be preferred to utilize an aqueous solution of sodium hydroxide or carbonate (preferably, the carbonate for the reasons given above) in a concentration within the range of 0.5 to 1.5% by weight. In this regard, the petroleum sulfonates and sulfates are very effective in reducing interfacial tensions in solutions of at least .05% by weight of sodium hydroxide or sodium carbonate. On the other hand, the adsorption of petroleum sulfates or sulfonates on rock surfaces is increased by the higher concentrations. Thus, it usually will be undesirable for the concentration of sodium hydroxide or carbonate to exceed a value of about 1.5% by weight.

Sufficient amounts of the carbonate or hydroxide should be injected to satisfy the adsorptive tendency of the formation rock surfaces for the alkali, and to leave a residual concentration of about .05% in the flood water. In view of these considerations, it is preferred to inject the solution of sodium hydroxide or sodium carbonate in an amount of at least ten percent pore volume of the recovery zone. This solution desirably will be graded from an initial concentration of about 1.5% by weight to a final concentration of about .05% by weight. The alkaline solution then may be moved through the reservoir by the injection of a suitable fluid such as oil field brine.

Having described specific embodiments of the instant invention, it will be understood that further modifications thereof may be suggested to those skilled in the art, and it is intended to cover all such modifications as fall within the scope of the appended claims.

What is claimed is:
1. In the production of oil from a subterranean oil reservoir penetrated by spaced injection and production systems defining a recovery zone of said reservoir, the method comprising:
 (a) introducing an oxygen-containing gas into the recovery zone of said reservoir to form hydroperoxides of saturated aliphatic constituents of said oil,
 (b) thereafter introducing an aqueous solution of a bisulfite selected from the class consisting of the alkali metal bisulfites and ammonium bisulfite into said recovery zone and into contact with said hydroperoxides to convert said hydroperoxides to surface-active sulfoxy acids,
 (c) thereafter introducing into said recovery zone via said injection system an aqueous flooding medium to displace oil to said production system, and
 (d) recovering oil from said production system.

2. The method of claim 1 wherein said aqueous solution has a bisulfite concentration within the range of 15 to 25 weight percent and is injected in an amount within the range of 2 to 10 percent of the total pore volume of said recovery zone.

3. The method of claim 1 wherein said aqueous bisulfite solution comprises sodium bisulfite.

4. The method of claim 1 wherein said oxygen-containing gas and said aqueous bisulfite solution are introduced into said recovery zone by injection through said injection system.

5. The method of claim 4 wherein the injection of said aqueous bisulfite solution is initiated at least seven days after the first injection of said oxygen-containing gas.

6. The method of claim 4 wherein said oxygen-containing gas is injected in an amount of at least 10 percent of the total pore volume of said recovery zone.

7. The method of claim 4 wherein the injection of said oxygen-containing gas is maintained until it reaches said production system.

8. The method of claim 1 wherein said flooding medium comprises an aqueous alkaline solution to neutralize said sulfoxy acids and produce salts thereof.

9. The method of claim 1 wherein said flooding medium comprises an aqueous solution of a base selected from the class consisting of the alkali metal hydroxides, the alkali metal carbonates, ammonium hydroxide and ammonium carbonate.

10. The method of claim 1 wherein said flooding medium comprises an aqueous solution of a base selected from the class consisting of sodium hydroxide and sodium carbonate in a concentration within the range of .05 to 1.5 weight percent.

11. The method of claim 10 wherein said aqueous solution of a base is injected in an amount of at least 10 percent pore volume of said recovery zone.

12. The method of claim 10 wherein said base is sodium carbonate.

References Cited
UNITED STATES PATENTS

| | | | |
|---|---|---|---|
| 2,725,106 | 11/1955 | Spearow | 166—9 |
| 3,036,631 | 5/1962 | Holbrook | 166—9 |
| 3,047,062 | 7/1962 | Meadors | 166—9 |
| 3,111,984 | 11/1963 | Reisberg | 166—9 |
| 3,111,985 | 11/1963 | Reisberg | 166—9 |
| 3,167,119 | 1/1965 | Meadors | 166—9 |
| 3,185,214 | 5/1965 | Bernard et al. | 166—9 |
| 3,195,629 | 7/1965 | Leach | 166—9 |
| 3,258,072 | 6/1966 | Froning | 166—9 |
| 3,259,187 | 7/1966 | Prats et al. | 166—11 |
| 3,302,711 | 2/1967 | Dilgren | 166—9 |

STEPHEN J. NOVOSAD, *Primary Examiner.*